(No Model.)
H. F. JACOBY.
BEER TAP.
No. 498,657. Patented May 30, 1893.
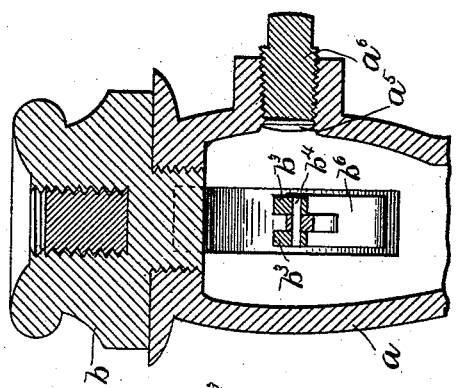
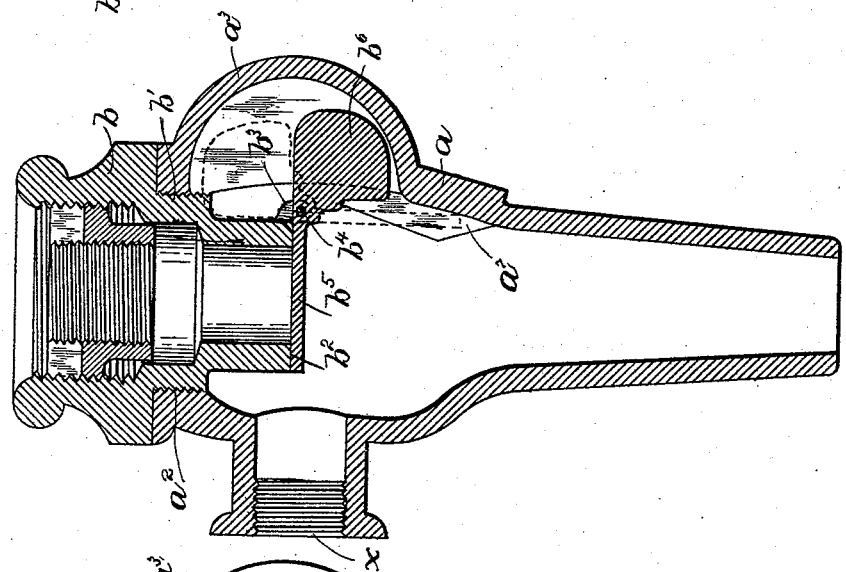
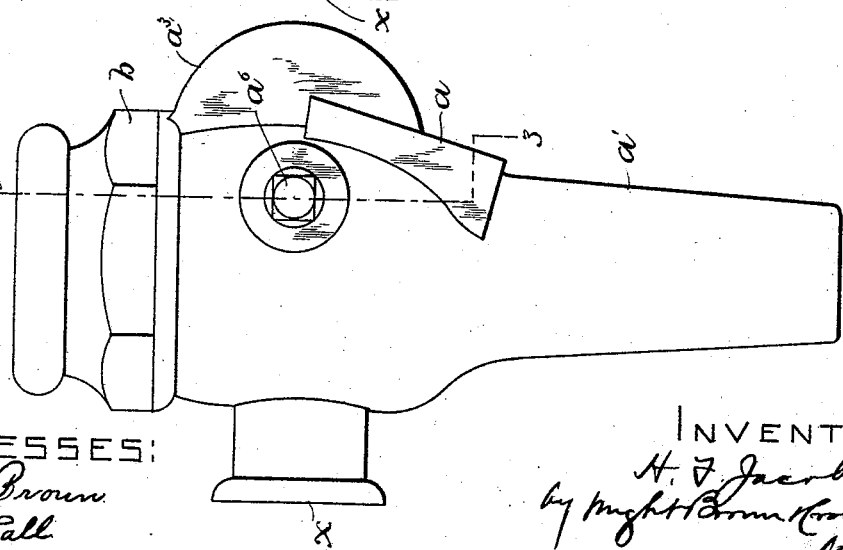
WITNESSES:
H. E. Brown
H. A. Hall
INVENTOR:
H. F. Jacoby
by Wright Brown Crosley
Attys.

UNITED STATES PATENT OFFICE.

HARVEY F. JACOBY, OF TOLEDO, OHIO.

BEER-TAP.

SPECIFICATION forming part of Letters Patent No. 498,657, dated May 30, 1893.

Application filed September 19, 1892. Serial No. 446,292. (No model.)

*To all whom it may concern:*

Be it known that I, HARVEY F. JACOBY, of Toledo, in the county of Lucas and State of Ohio, have invented certain new and useful Improvements in Beer-Taps, of which the following is a specification.

This invention relates to taps or fittings which are inserted in the heads of beer kegs to receive the faucets through which the beer is drawn. A beer tap usually comprises a tubular shank, which is driven into the head of the keg, and a socket in the outer portion of the shank for the reception of the ordinary faucet. The tap is provided with some means for preventing the escape of the beer before the faucet is inserted, the common means being a cork or plug driven into the tap and adapted to be forced inwardly into the barrel, to permit the beer to flow into the faucet when the latter is inserted. In some instances the tap has been provided with a valve at the inner end of the faucet socket, said valve being arranged to yield to the faucet when the latter is inserted, the valve being held closed until the insertion of the faucet.

My invention consists in certain improvements in valves of this class, whereby the tap is automatically closed by means of a weighted valve, the said valve being arranged to be displaced by the faucet when the latter enters the socket formed for its reception in the tap.

Of the accompanying drawings forming part of this specification, Figure 1 represents a side elevation of a beer tap provided with my improvements. Fig. 2 represents a longitudinal section of the same. Fig. 3 represents a section of the line 3 3 of Fig. 1.

The same letters of reference indicate the same parts in all the figures.

My improved beer tap comprises the body portion $a$, having a tapering tubular shank $a'$, formed to be driven into an orifice in the head of a beer barrel, and the detachable fitting or faucet socket $b$, having a screw-threaded neck $b'$, which is engaged with an internally-threaded orifice formed in the body $a$, as shown in Fig. 2. The inner end of the socket or fitting $b$ projects into the interior of the body $a$, and is ground off to present a flat surface or valve seat $b^2$. The inner end of the socket $b$ is provided with ears $b^3$, to which is connected by a pivot $b^4$ the valve $b^5$, which is formed to bear against the seat $b^2$ and thus tightly close the socket and prevent the escape of beer therethrough. The valve $b^5$ is provided with a weight $b^6$, which, when the barrel is standing on end in the position it usually occupies when the beer is stored and not being consumed, is arranged to hold the valve closed against the seat $b^2$. The body $a$ of the tap is provided with an enlargement or recess $a^3$, which receives the weight $b^6$ and permits the necessary movements of said weight, caused by the opening and closing of the valve, as indicated by the full and dotted lines in Fig. 2. When the barrel is charged with beer the pressure of the beer against the valve holds the latter tightly against its seat. When the faucet is introduced into the fitting or socket $b$, the inner end of the socket strikes the valve and forces the latter away from its seat, so that the beer is free to enter the faucet. The inner end of the socket $b$, or that end on which the valve seat is formed, is of considerably smaller diameter than the orifice $a^2$ in the body of the tap, into which the socket $b$ is screwed, said orifice being of sufficient size to permit the insertion of the inner end of the socket and its valve-securing ears $b^3$ into the body of the tap.

To permit the connection of the valve with the ears $b^3$ after the socket $b$ has been screwed to place, I provide the body $a^3$ with an orifice $a^5$, arranged in line with the holes formed in $b^3$ to receive the pivot $b$. Said orifice $a^5$ is internally threaded, and is provided with a threaded plug $a^6$, which tightly closes the orifice when the device is in use.

In assembling the parts above described I introduce the valve into the body $a$ before connecting it with the ears $b^3$. I then insert the plug $b$ and screw it firmly to place, the arrangement being such that the ears $b^3$ will coincide with the orifice $a^5$ when the socket $b$ has been screwed to place. I then insert the pivot $b$ through the orifice $a^5$, the pivot passing through the holes drilled to receive it in the valve and in the ears $b^3$. After the insertion of the pivot I insert the plug $a^6$, the device being then ready for operation. The body portion $a$ is also provided with a recess at $a^7$ for the reception of the outer end of the valve when the latter is swung to the position shown in dotted lines in Fig. 2.

I claim—

1. In a beer tap, the combination of the body $a$, having the screw-threaded orifice $a^2$, the chamber or enlargement $a^3$, and the orifice $a^5$, the faucet socket $b$, having a screw-threaded portion $b'$, formed to engage the orifice $a^2$, and a reduced inner end, provided with a valve seat $b^2$ and ears $b^3$, said inner end, with its ears, being formed to pass through the orifice $a^2$, the ears being in line with the orifice $a^5$ when the socket $b$ is in place, and the valve $b^5$ pivoted to the ears $b^3$ and provided with a weight projecting into the enlargement $a^3$, as set forth.

2. In a beer tap, the combination of the body $a$, having the screw-threaded orifice $a^2$, the chamber or enlargement $a^3$, the recess $a^7$, and the orifice $a^5$, the faucet socket $b$, having a screw-threaded portion $b'$, formed to engage the orifice $a^2$, and a reduced inner end, provided with a valve seat $b^2$ and ears $b^3$, said inner end, with its ears, being formed to pass through the orifice $a^2$, the ears being in line with the orifice $a^5$ when the socket $b$ is in place, and the valve $b^5$ pivoted to the ears $b^3$ and provided with a weight projecting into the enlargement $a^3$, as set forth.

In testimony whereof I have signed my name to this specification, in the presence of two subscribing witnesses, this 7th day of September, A. D. 1892.

HARVEY F. JACOBY.

Witnesses:
FREDERICK A. KUMLER,
ALLEN DE VILLISS.